United States Patent
McCahon et al.

(10) Patent No.: US 12,320,702 B2
(45) Date of Patent: Jun. 3, 2025

(54) PATHOGEN DETECTION AND NEUTRALIZATION USING DEEP UV-C GENERATION VIA SEEDED RAMAN AMPLIFICATION AND SECOND HARMONIC GENERATION

(71) Applicant: Applied Energetics, Inc., Tucson, AZ (US)

(72) Inventors: Stephen William McCahon, Tucson, AZ (US); Alan Kost, Tucson, AZ (US)

(73) Assignee: Applied Energetics, Inc., Tucson, AZ (US)

( * ) Notice: Subject to any disclaimer, the term of this patent is extended or adjusted under 35 U.S.C. 154(b) by 390 days.

(21) Appl. No.: 18/064,116

(22) Filed: Dec. 9, 2022

(65) Prior Publication Data

US 2023/0184590 A1  Jun. 15, 2023

Related U.S. Application Data

(60) Provisional application No. 63/265,250, filed on Dec. 10, 2021.

(51) Int. Cl.
*G01J 3/44* (2006.01)
*G01N 21/64* (2006.01)
*G01N 21/65* (2006.01)

(52) U.S. Cl.
CPC ............ *G01J 3/44* (2013.01); *G01N 21/64* (2013.01); *G01N 21/65* (2013.01)

(58) Field of Classification Search
CPC ........... G01J 3/44; G01N 21/64; G01N 21/65; G01N 21/6486
See application file for complete search history.

(56) References Cited

U.S. PATENT DOCUMENTS

| | | | | |
|---|---|---|---|---|
| 2008/0059135 A1* | 3/2008 | Murugkar | ............ | G01J 3/4338 703/11 |
| 2009/0174930 A1* | 7/2009 | McCahon | ............... | H01S 3/235 359/334 |

* cited by examiner

*Primary Examiner* — David P Porta
*Assistant Examiner* — Casey Bryant
(74) *Attorney, Agent, or Firm* — Martensen IP; Michael C. Martensen

(57) ABSTRACT

A high brightness, wavelength-adjustable, deep-UV-C light source identifies, neutralizes, and validates the absence of one or more pathogens. An optical source using a Raman-based nonlinear optical amplification process converts low brightness continuous wave (CW) and Quasi-CW pump light into high brightness and high peak power optical UV-C radiation at a specific wavelength, pulse duration, repetition rate, and optical bandwidth for targeted pathogen identification, neutralization, and absence validation. A tunable Raman-based output operates at a wavelength between 400 nm and 460 nm, which is employed for Raman spectroscopic pathogen detection, and which is frequency doubled to the Deep-UV-C (DUV-C) spectral region of between 200 nm to 230 nm for fluorescence detection of potential pathogens.

30 Claims, 12 Drawing Sheets

540
AGGREGATED
PROTEINS

530
USP LASER LIGHT
SCATTERING 510        520
NATIVE      PARTIALLY UNFOLDED
PROTEIN     PROTEIN
            (TRANSIENT STATE)

HIGH DENSITY
LOW DENSITY

550
NATIVE (OR NATIVE-LIKE)
PROTEINS

USP LASER-TREATED MCMV

FAILURE OF CAPSID
UNCOATING
NO REPLICATION
NO GENE
EXPRESSION
560

100    120
NUCLEUS   170
160

FIG.5

```
                    ┌─┐
                    │C│
                    └┬┘
                     ▼
┌─────────────────────────────────────────┐
│ RESPONSIVE TO DETECTING THE WAVELENGTH  │
│  DISTRIBUTION OF FLUORESCENCE EMISSION  │
│ SPECTRUM BY A SELECT CLASS OF PAHTONGENS,│─ 850
│ BLOCK THE FIRST LIGHT OUTPUT AND UNBLOCK THE│
│           SECOND LIGHT OUTPUT           │
└──────────────────┬──────────────────────┘
                   ▼
┌─────────────────────────────────────────┐
│ DIRECT THE SECOND LIGHT OUTPUT WITH A LONGER │
│   WAVELENGTH TO THE SUSPECTED AREA OF   │─ 865
│              CONTAMINATION              │
└──────────────────┬──────────────────────┘
                   ▼
                  ┌─┐
                  │D│
                  └─┘
```

FIG.8C

PATHOGEN DETECTION AND NEUTRALIZATION USING DEEP UV-C GENERATION VIA SEEDED RAMAN AMPLIFICATION AND SECOND HARMONIC GENERATION

RELATED APPLICATION

The present application relates to and claims the benefit of priority to U.S. Provisional Patent Application No. 63/265,250 filed 10 Dec. 2021 which is hereby incorporated by reference in its entirety for all purposes as if fully set forth herein.

BACKGROUND OF THE INVENTION

Field of the Invention

Embodiments of the present invention relate, in general, to seeded Raman amplification and more particularly to harmonic generation of deep UV-C seeded Raman amplification.

Relevant Background

It is well known that certain ultraviolet (UV) wavelengths of light can be used to sterilize an environment. UV radiation is a form of energy measured on the electromagnetic spectrum positioned between X-Rays and visible light. There are three main types of UV radiation. They are UV-A, UV-B and UV-C. UV-A rays have the longest wavelengths, followed by UV-B, and UV-C rays which have the shortest wavelengths. Sunlight is the most common source of UV radiation and while UV-A rays are transmitted through the atmosphere, all UV-C and some UV-B rays are absorbed by the Earth's ozone layer. So, most of the UV rays reaching the surface of the earth are UV-A with a small amount of UV-B. UV-C possesses the highest energy portion of the UV radiation spectrum.

There is some evidence that UV-B is effective in inactivating certain virus strains however it is less effective that UV-C and is more hazardous to humans since UV-B can penetrate deeper into the skin. Also, UV-B has been known to cause DNA damage as well as being a risk factor in developing skin cancer.

UV-A is less hazardous than UV-B radiation but is also significantly less effective than either UV-B or UV-C radiation at inactivating viruses. Moreover, UV-A is also implicated in skin aging and skin cancer.

To better understand the application of UV radiation as pathogen detection and neutralization mechanism consider the viral genome 100 illustrated in FIGS. 1A and 1B. As shown in FIG. 1A, a representative viral genome 110 occupies the interior of capsid proteins 120 in a liquid environment 130 encased by envelope proteins 140.

The envelope proteins 140 of a typical virus 110 facilitate delivery 150 of the capsid proteins 120 through a cell membrane 160 and ultimately to the nucleus 170. Once through the cell membrane the capsid proteins 120 "un-coat" releasing the viral genome (DNA) for penetration into the nucleus where replication of the gene expression occurs thereby infecting the host.

UV-C radiation of sufficient energy and at the correct wavelength is known to prevent capsid protein uncoating resulting in no replication of the gene expression of the virus. The challenge becomes presenting enough UV-C radiation to the enveloped virus to cause neutralization/inactivation without further damage to the cell structure and DNA.

Most UV lamps and metal-vapor lasers have UV-C output, but they are not sufficiently bright (lack sufficient power) to cause virus inactivation. Also, these sources produce UV-C output only at a very limited number of fixed wavelengths. This limits their use in certain applications. For example, their wavelength cannot be adjusted for optical characterization of specific pathogens. And lamps that do produce sufficient UV-C energy to cause virus inactivation present a significant safety risk.

As implied above, not all UV-C lamps are the same. Lamps may emit very specific UV-C wavelengths, or they may emit a broad range of UV wavelengths at a lower intensity. Some lamps also emit visible and infrared radiation simultaneously. The wavelengths emitted by the lamp affect the lamp's effectiveness at inactivating a virus and impact the health and safety risks associated with the lamp. For example, lamps that emit UV-C at 254 nm have been known to present a safety risk to any exposed user. Thus, use of such lamps must be isolated to prevent human interaction.

Excimer lasers can have a bright UV-C output sufficient for virus inactivation, but also have a limited number of fixed wavelengths. Excimer lasers are also bulky, expensive, contain toxic gases, and often require extensive and costly maintenance.

What is needed is a tunable very-bright deep-UV-C source for various applications, including detection and irradiation of a variety of virions for identification, sterilization (neutralization), and viral absence validation purposes. These and other deficiencies of the prior art are addressed by one or more embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

A bright, deep UV-C pulsed light source detects, neutralizes, and thereafter validates the absence of one or more pathogens in a suspected contaminated area or environment. According to one embodiment of the present invention, a first pulsed light is produced with an optical spectrum at a first source wavelength by a pulsed light source. The pulsed light source is coupled to a tunable Raman amplification cavity having access to one or more Raman amplification mediums thereby producing a first selectable amplified pulsed light. A wavelength convertor linked to the tunable Raman amplification accepts the first selectable amplified light pulse forming a first light output with a first output wavelength that, upon being directed to an area or region contaminated by a presence of a class of pathogens, produces fluorescence by generating a wavelength distribution of an emission spectrum. Ascertaining the wavelength distribution of emission spectrum by fluorescence linked to the first light output, and ultimately to the pulsed light source and the tunable Raman amplifier, the invention employs a second light output to refine its ability to detect and neutralize a select pathogen.

Responsive to detection by the detector of the wavelength distribution of emission spectrum from excitation by fluorescence, a second Raman amplification medium is selected based on the select class of pathogens detected in the target area. This second selected Raman amplification medium drives the tunable Raman amplification stage to produce a second selectable amplified light pulse. The wavelength convertor accepts the second selectable amplified light pulse to produce a second light output with a second output wavelength. This second output wavelength of the second light output is suitable to determine the presence of a select pathogen in the target area using Stokes Raman scattering. Upon recognizing Stokes Raman scattering by the detector the present invention matches the detected Stokes Raman scattering pattern to known scattering patterns identifying, and conclusively determining, the presence in the target area of the select pathogen. Moreover, by applying the second light output with a sufficient peak power to the target area over a period of time, the pathogen is neutralized. Once neutralized the detected Stokes Raman scattering shifts conclusively validating the lack of the select pathogen in the target area.

A methodology for detecting, neutralizing, and thereafter validating the absence of one or more pathogens in a suspected contaminated area or environment using bright, deep UV-C pulses includes producing a pulsed light with an optical spectrum at a first source wavelength by a pulsed light source. The pulsed light source is coupled with a tunable Raman amplification stage or cavity and one or more selectable Raman amplification mediums thereby amplifying the pulsed light based on a first selected Raman amplification medium. The process continues by converting the first selectable amplified pulse light by a wavelength convertor to a first light output with a first output wavelength and directing that output at the target area suspected of contamination. Responsive to a class of pathogens being present in the target area, a wavelength distribution of the emission spectrum by fluorescence is detected by a detector. Based on the results of the excitation by fluorescence, a second output light at longer wavelength is selected for use. This second selectable amplified pulsed light is suitable to determine the presence of a pathogen in the target area using Stokes Raman scattering. By matching observed Stokes Raman scattering to known scattering patterns a specific, a select pathogen present in the target area can be identified. Similarly, a lack of Stokes Raman scattering consistent with a select pathogen validates neutralization/absence of the pathogen.

The features and advantages described in this disclosure and in the following detailed description are not all-inclusive. Many additional features and advantages will be apparent to one of the ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein:

FIG. 5 is a graphical rendition of capsid protein aggregation and virion neutralization as a result of implementation of one embodiment of the present invention for laser pathogen detection and neutralization.

FIGS. 8A-8D present a flowchart of one method embodiment for laser pathogen detection and neutralization according to the present invention.

Figure 1A:
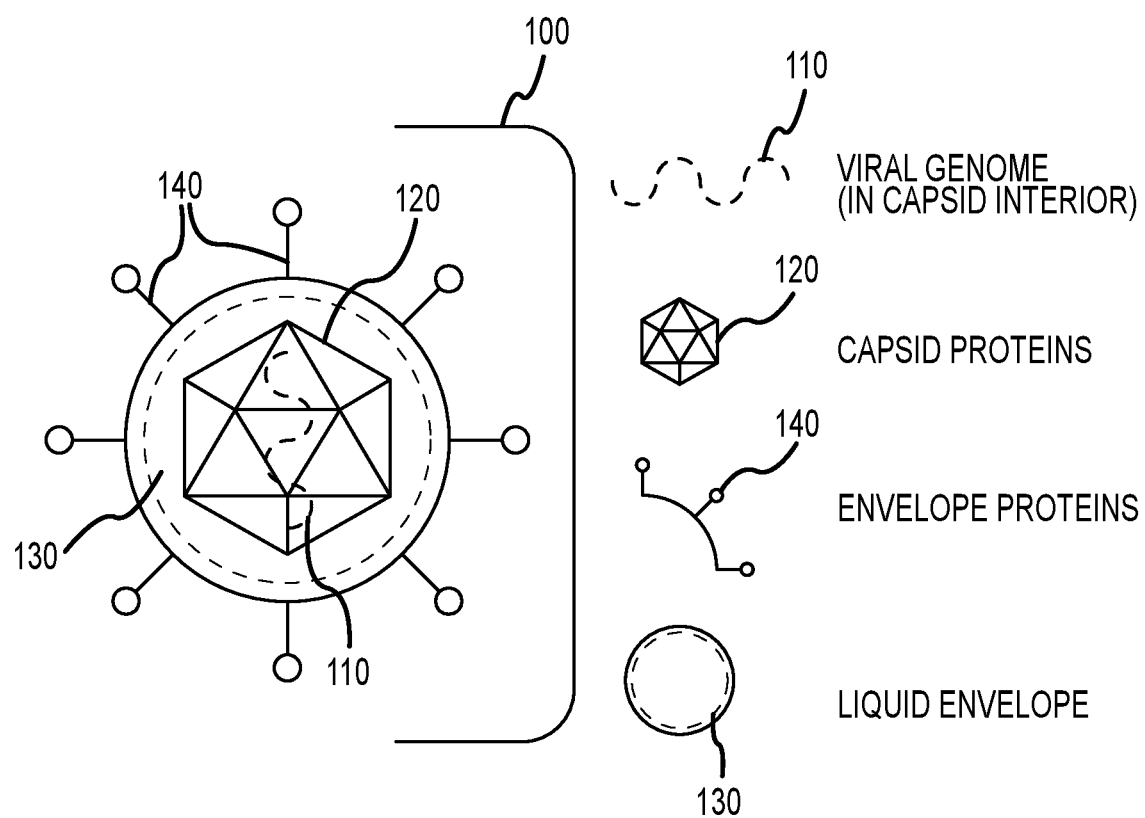
FIG. 1A shows an enveloped virion capsid as would be known to one of reasonable skill in the relevant art.
Figure 1B:
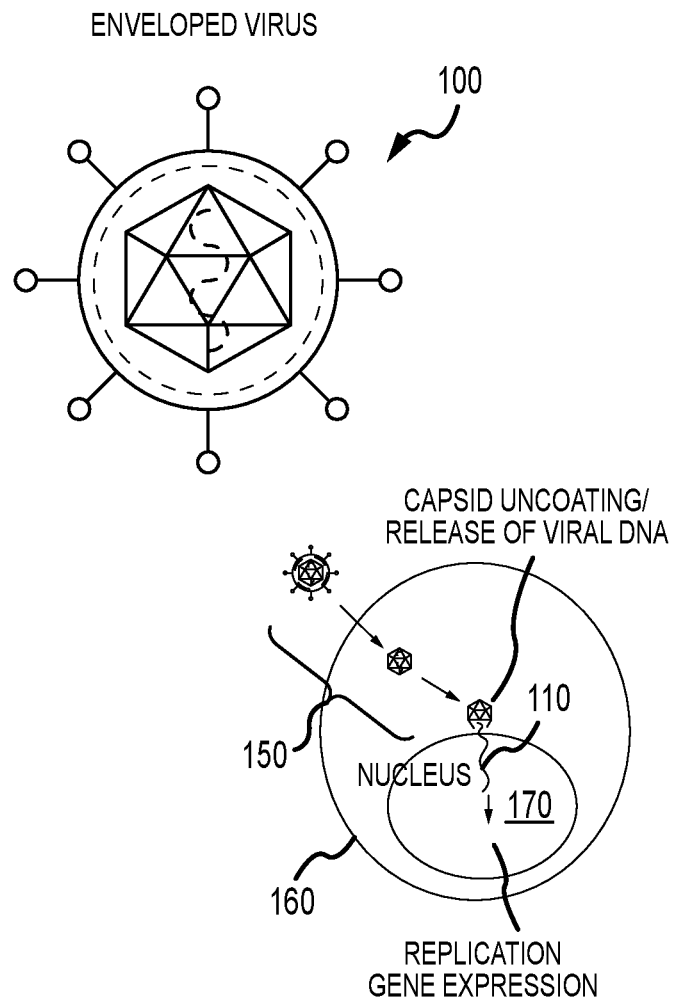
FIG. 1B presents a graphical rendition of capsid uncoating and release of viral DNA to a cell nucleus as would be known to one of reasonable skill in the relevant art.

The Figures depict embodiments of the present invention for purposes of illustration only. Like numbers refer to like elements throughout. In the figures, the sizes of certain lines, layers, components, elements, or features may be exaggerated for clarity. One skilled in the art will readily recognize from the following discussion that alternative embodiments of the structures and methods illustrated herein may be employed without departing from the principles of the invention described herein.

DESCRIPTION OF THE INVENTION

A high brightness, wavelength-adjustable, deep-UV-C light source identifies, neutralizes, and validates the absence of one or more pathogens. An optical source utilizes a Raman-based nonlinear optical amplification process converting low brightness continuous wave (CW) and Quasi-CW pump light into high brightness and high peak power optical UV-C radiation at a specific wavelength, pulse duration, repetition rate, and optical bandwidth for targeted pathogen identification, neutralization, and absence validation. The tunable Raman-based output operates, in one embodiment, at a wavelength between 400 nm and 460 nm which is frequency doubled to the Deep-UV-C (DUV-C) spectral region of between 200 nm to 230 nm for pathogen interaction.

The present invention is useful for both the detection and neutralization of pathogens. The detection and characterization of pathogens in a non-laboratory environment is very challenging due to of the low density of pathogen particles making "stand-off" characterization of pathogens at meter class distances challenging. The present invention resolves this challenge. Raman spectroscopy has been used to characterize viruses and other pathogens but historically the small amount of scattered light from prior systems has limited its use to bench-top analysis and microscopy. The very bright deep-UV source of the present invention enables stand-off analysis of pathogens.

The use of DUV-C radiation from 200 nm to 230 nm, as described herein, allows for the permanent inactivation of pathogens, and other applications, without the dangerous UV effects normally associated with disinfection lamps near 250 nm. While human exposure to 250+nm light is known to be harmful, ~225 nm light is substantially absorbed in the outer most layers of the skin, which is comprised of dead skin cells making it safe for human exposure.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terminology used herein is for the purpose of describing embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

It will be also understood that when an element is referred to as being "on," "attached" to, "connected" to, "coupled" with, "contacting", "mounted" etc., another element, it can be directly on, attached to, connected to, coupled with, or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The term Raman Amplification is understood to mean laser light amplified by the absorption of photons from a pumped signal to a seed signal that are then immediately re-emitted as lower-frequency laser-light photons ("Stokes" photons) by a process called stimulated Raman scattering. The difference between the two photon energies, the pump signal, and the seed signal, is fixed and corresponds to a vibrational frequency of the gain medium, also referred to herein as the Raman amplification medium. Choosing the pump (Raman amplification medium) and seed signal wavelength appropriately enables production of select laser-output wavelengths.

In typical Raman amplification, a photon population inversion is first created forming a laser emission, or the pumped laser signal. The emission is thereafter amplified via a Raman amplifier. Raman Amplification is based on the Stimulated Raman Scattering (SRS) phenomenon when a lower frequency signal photon induces the inelastic scattering of a higher-frequency pump photon in an optical medium in the nonlinear regime. As a result of this, another signal photon is produced, with the surplus energy resonantly passed to the vibrational states of the medium. This process, as with other stimulated emission processes, allows all-optical amplification.

Raman Amplification Scattering, also referred to herein as inelastic scattering of photons by Stokes Raman scattering, is understood to mean the inelastic scattering of photons by matter, meaning that there is both an exchange of energy and a change in the light's direction. Typically, this effect involves vibrational energy being gained by a molecule as incident photons from a visible laser are shifted to lower energy. This phenomenon is called normal Stokes Raman scattering. The effect is exploited to gain information about materials for a variety of purposes by performing various forms of Raman spectroscopy.

Light has a certain probability of being scattered by a material. When photons are scattered, most of them are elastically scattered (Rayleigh scattering), such that the scattered photons have the same energy (frequency, wavelength, and color) as the incident photons but are directed toward a different direction. Rayleigh scattering usually has an intensity in the range 0.1% to 0.01% relative to that of a radiation source. An even smaller fraction of the scattered photons (approximately 1 in 1 million) can be scattered inelastically, with the scattered photons having an energy different (usually lower) from those of the incident photons—these are Raman scattered photons. Because of conservation of energy, the material either gains or loses energy in the process.

Coherent Anti-Stokes Raman Scattering, also called Coherent anti-Stokes Raman scattering spectroscopy (CARS), is understood to mean a form of spectroscopy used primarily in chemistry, physics, and related fields. This scattering is sensitive to the same vibrational signatures of molecules as seen in Raman spectroscopy, typically the nuclear vibrations of chemical bonds. Unlike Raman spectroscopy (see below), CARS employs multiple photons to address the molecular vibrations, and produces a coherent signal. As a result, CARS is orders of magnitude stronger than spontaneous Raman emission. CARS is a third-order nonlinear optical process involving three laser beams: a pump beam of frequency op, a Stokes beam of frequency $\omega S$ and a probe beam at frequency $\omega pr$. These beams interact with the sample and generate a coherent optical signal at the anti-Stokes frequency ($\omega pr + op - \omega S$). The latter is resonantly enhanced when the frequency difference between the pump and the Stokes beams ($\omega p - \omega S$) coincides with the frequency of a Raman resonance, which is the basis of the technique's intrinsic vibrational contrast mechanism.

Raman spectroscopy is understood to mean a spectroscopic technique used to determine vibrational modes of molecules, although rotational and other low-frequency modes of systems may also be observed. Raman spectroscopy is commonly used in chemistry to provide a structural fingerprint by which molecules can be identified. Raman spectroscopy relies upon inelastic scattering of photons, known as Raman scattering (see above) exciting the sample. This excitation puts the molecule into a virtual energy state for a short time before the photon is emitted. Inelastic scattering means that the energy of the emitted photon is of either lower or higher energy than the incident photon. A source of monochromatic light, usually from a laser in the visible, near infrared, or near ultraviolet range is used. The laser light interacts with molecular vibrations, phonons, or other excitations in the system, resulting in the energy of the laser photons being shifted up or down. The shift in energy gives information about the vibrational modes in the system.

Florescence Spectroscopy, also referred to herein as wavelength distribution of emission spectrum from excitation by fluorescence, is understood to mean a type of electromagnetic spectroscopy that analyzes fluorescence from a sample. It involves using a beam of light, usually ultraviolet light, that excites the electrons in molecules of certain classes of compounds and causes them to emit light; typically, but not necessarily, visible light. In the special case of single molecule fluorescence spectroscopy, intensity fluctuations from the emitted light are measured from either single fluorophores, or pairs of fluorophores.

Molecules have various states referred to as energy levels. Fluorescence spectroscopy is primarily concerned with electronic and vibrational states. Generally, the species being examined has a ground electronic state (a low energy state) of interest, and an excited electronic state of higher energy. Within each of these electronic states there are various vibrational states. Fluorescence, the species is first excited, by absorbing a photon, from its ground electronic state to one of the various vibrational states in the excited electronic state. Collisions with other molecules cause the excited molecule to lose vibrational energy until it reaches the lowest vibrational state from the excited electronic state. The molecule then drops down to one of the various vibrational levels of the ground electronic state again, emitting a photon in the process. As molecules may drop down into any of several vibrational levels in the ground state, the emitted photons will have different energies, and thus frequencies. Therefore, by analyzing the different frequencies of light emitted in fluorescent spectroscopy, along with their relative intensities, the structure of the different vibrational levels can be determined and classified. In doing so individual molecules, including classes of pathogens, can be characterized by specific emission structures.

Included in the description are flowcharts depicting examples of the methodology which may be used to detect and neutralize pathogens using deep UV-C generated via seeded Raman amplification and second harmonic generation. In the following description, it will be understood that one or more blocks of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware or hardware-based computer systems that perform the specified functions or steps, or combinations of special purpose hardware and computer instructions.

While the invention is herein shown and described with reference to embodiments, it will be understood by those skilled in the art that various other changes in the form and details may be made without departing from the spirit and scope of the invention.

Figure 2:
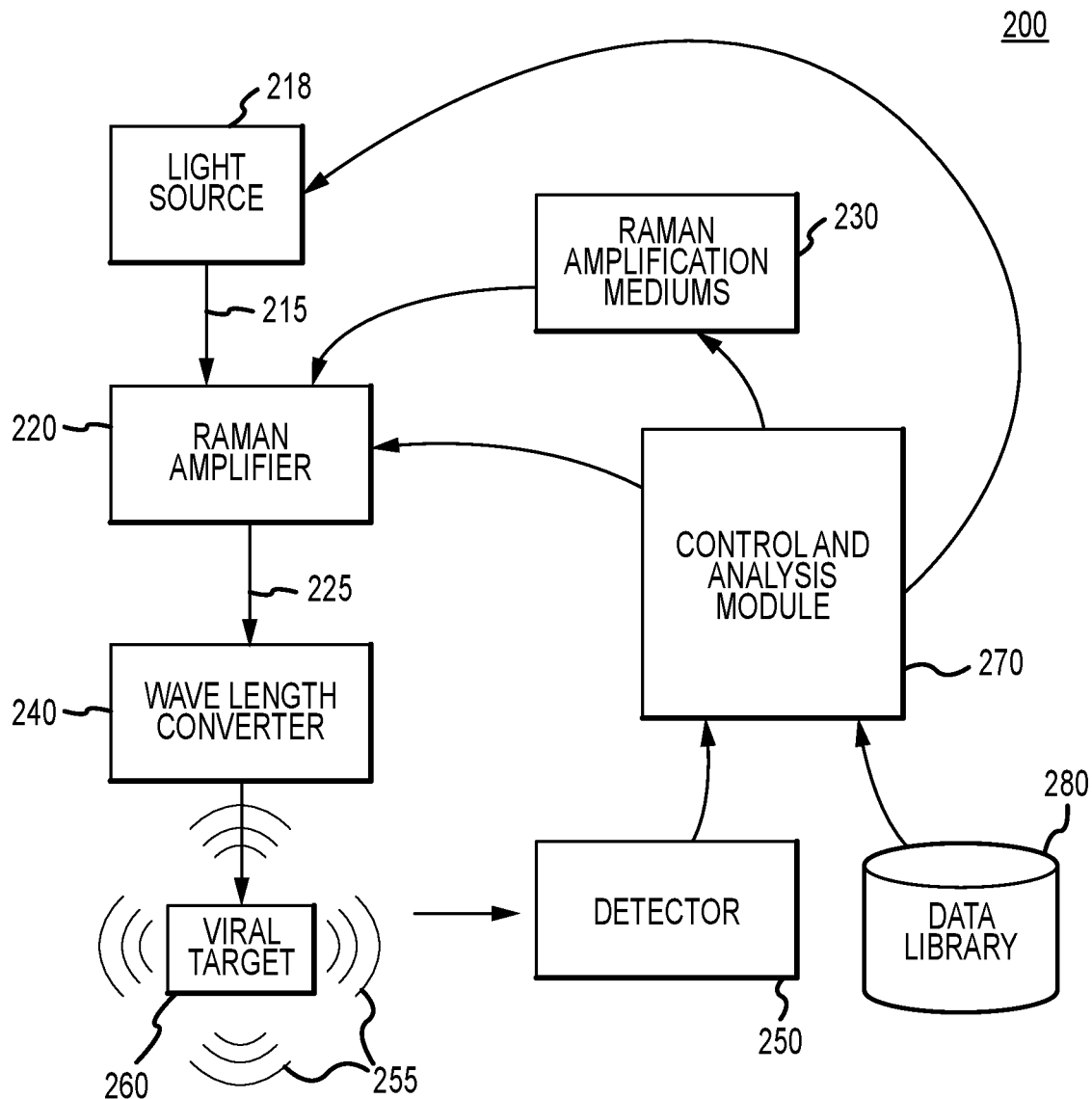
FIG. 2 is a high-level system diagram of a laser pathogen detection and neutralization system according to one embodiment of the present invention.

A deep, high intensity UV-C system for pathogen detection and neutralization according to one embodiment of the present invention is shown in FIG. 2. The deep UV-C system 200 of the present invention detects and neutralizes pathogens and thereafter validates that the virus is no longer present. Moreover, the present invention provides a tunable high intensity UV-C light making it applicable for a wide variety of pathogen interdiction operations. At a high level the system of the present invention includes a light source 210 coupled to a Raman amplifier 220. Using the Stimulated Raman Scattering phenomenon, the lower frequency seed photon induces inelastic scattering of a higher-frequency pump photon in an optical medium in the nonlinear regime. As a result, another photon is produced with surplus energy resonantly passed from the vibrational states of a select Raman medium.

By selecting the seed signal 215 and a Raman medium 230 for use in the Raman amplifier a selectable amplified pulsed light 225 is produced. A wavelength converter 240, employing in one embodiment a nonlinear optical crystal, modifies the wavelength of the amplified pulsed light to form a light output 245 with an output wavelength that is safe for human exposure yet effective for pathogen detection and neutralization.

A detector 250 observes the interaction 255 between a viral target 260, or a contaminated area, and the light output. Upon detecting a wavelength distribution of emission spectrum from excitation by fluorescence of a select class of pathogens in a target area 260, a control and analysis module 270 tunes the light source 210 and/or the Raman amplifier 220 to precisely identify and attack a target viral genome. By modifying the seed 215 and/or the Raman amplification medium 230 the wavelength and/or average power of the selectable amplified pulsed light 225 be altered (converted) and again directed at the target area 260.

With the wavelength of the light output refined, the detector 250/control and analysis module 270 examines the interaction 255 of the pulsed light and target area 260 for inelastic scattering of photons by Stokes Raman scattering. Inelastic scattering of photons by Stokes Raman scattering of a virus such as SARS-COV-2 or HCoV-229E is very specific. By comparing the emissions to known fluorescence and photon scattering profiles stored in a data library 280 the presence (and absence) of a class of pathogens and specific virions can be, respectively, identified. Concurrently, the high brightness and peak power pulses of the produced light output induces capsid protein vibration of the select virion stabilizing the capsid thereby inhibiting its ability to open within a cell.

Figure 3:
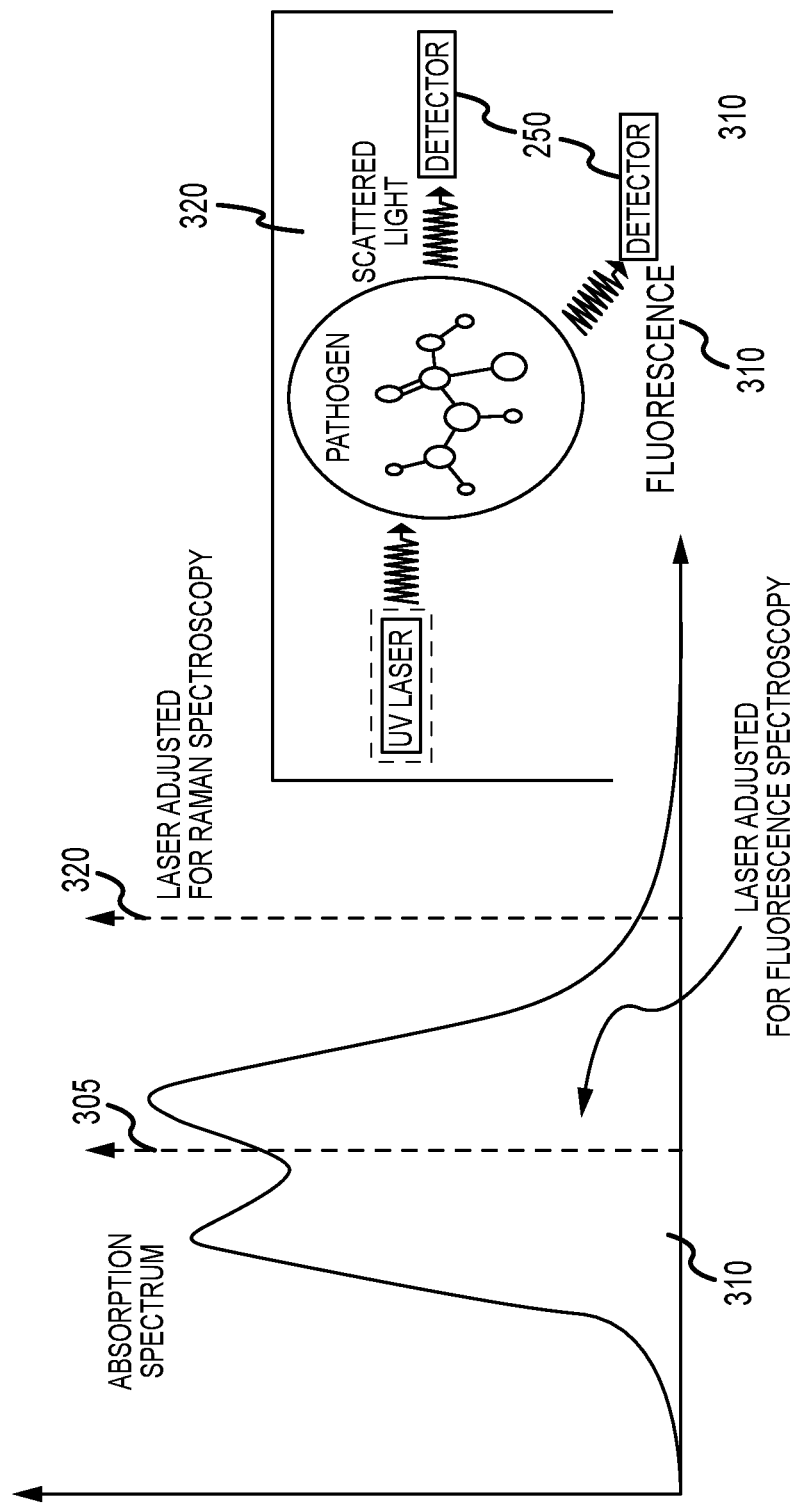
FIG. 3 is an exemplar absorption spectrum of tunable laser light, according to one embodiment of the present invention, for laser pathogen detection and neutralization.

FIG. 3 provides a graphical illustration of the tunability aspects of the present invention. Fluorescence spectroscopy is known to produce identifiable emissions of classes of substances. As light of a certain wavelength interacts with a class of viruses the emissions are recognizable and can be used to verify that one or more of the viruses within that viral classes are present. Emission from fluorescence spectroscopy is relatively easy to detect but the information is unspecific as to the exact virus (or substance) within a class of viruses. For example, a light output of the present invention directed at an area suspected of being contaminated by one strain of Covid 19 may yield an emission confirming that a coronavirus class is present.

Coronaviruses (CoVs) are a family of viruses that cause respiratory and intestinal illnesses in humans and animals. They usually cause mild colds in people but the emergence of the severe acute respiratory syndrome (SARS) epidemic in China in 2002-2003 and the Middle East respiratory syndrome (MERS) on the Arabian Peninsula in 2012 show they can also cause severe disease. Severe acute respiratory syndrome coronavirus 2 (SARS-COV-2) is the virus responsible for the outbreak of coronavirus disease (COVID-19), which was first identified in Wuhan, China.

Coronaviruses are relatively simple structures. They are spherical and coated with spikes of protein. These spikes help the virus bind to and infect healthy cells. The structure produces the emission by fluorescence spectroscopy 310 confirming that a coronavirus is present. But while SARS-COV can be deadly, HCoV-NL63 or HCoV-229E (for example) normally produce a mild respiratory illness. Yet the fluorescence spectroscopy emissions may be identical as they are all the same class of virion.

Raman Spectroscopy 320, by comparison, is very precise. The inelastic scattering of photons by Stokes Raman scattering of a SAR-COV virus is different than that of HCoV-NL63 or other types of coronaviruses. But detecting Raman inelastic scattering can be masked. The tunability of the present invention allows a first light output to confirm the presence (or absence) of a class of virion and/or adjust the wavelength of the output maximize absorption thereby making emissions more prevalent. At the same time the present invention can fine tune the wavelength of the second light output 320 to identify a specific or selected virus without being masked by the absorption spectrum 310 of fluorescence spectroscopy.

One aspect of the present invention directs pulsed UV-C light at an area suspected to be contaminated by one or more viruses. For example, the light output can be directed across a ventilation shaft to look for airborne viruses in facility's heating, ventilation, and air conditioning system. Various wavelengths can be generated and detected with the emissions by fluorescence compared to known wavelength distribution emissions stored in a library and communicatively coupled to the control an analysis module. Upon detecting an emission by fluorescence matching a class of virion the system can adjust the wavelength to search for select viruses in that class of virion using Raman Spectroscopy.

Figure 4:
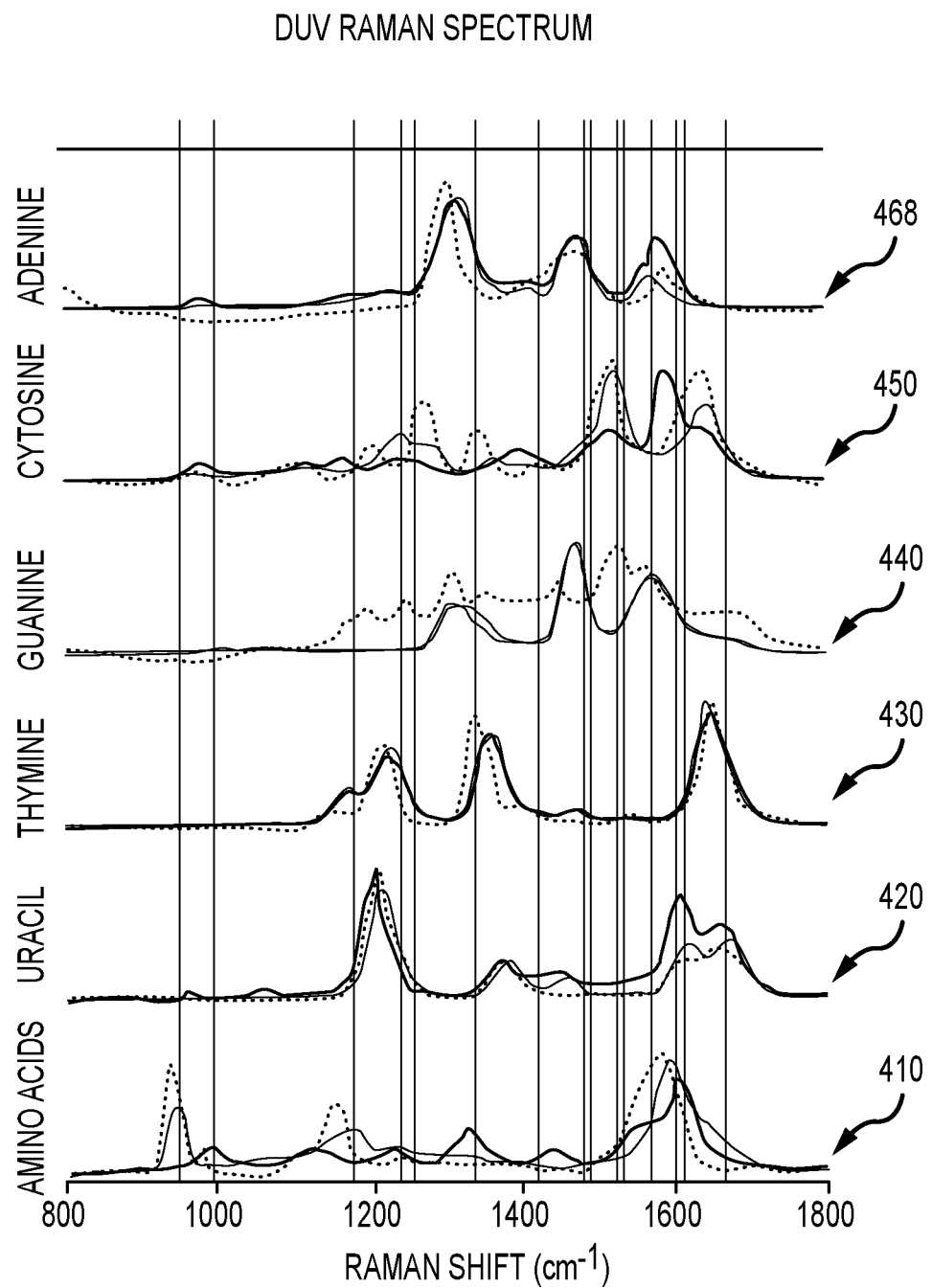
FIG. 4 is a graphic of a partial library of Stokes Raman scattering patterns used in accordance with one embodiment of the present invention, for laser pathogen detection and neutralization.

FIG. 4 presents an illustrative example of photons patterns induced by inelastic Stokes Raman scattering. Shown are graphical renderings of inelastic photon scattering patterns of Amino Acids 410, Uracil 420, Thymine 430, Guanine 440, Cytosine 450, and Adenine 460. Similar patterns of known viruses can be determined and stored in the library of the present system along with the wavelength of light required to generates such scattering.

Once a select or specified virus is found, high brightness and high peak power pulses at the correct wavelength can be directed at the target are to induce capsid protein vibration. In one embodiment of the present invention the average peak power can be scaled from mw to kW. As illustrated in FIG. 5, the capsid proteins 510 are transiently partially unfolded 520 by vibration induced by USP laser light 530 thereby exposing hydrophobic regions of the proteins. Aggregated proteins 540 are formed before the proteins refold 550 due to the high density of proteins within a virion. The resultant aggregated proteins stabilize the capsid 560 inhibiting the capsid from opening within a cell. The deep UV-C pulses of the present invention modify the ability of the capsid to transfer the genome material to the host cell.

Figure 6:
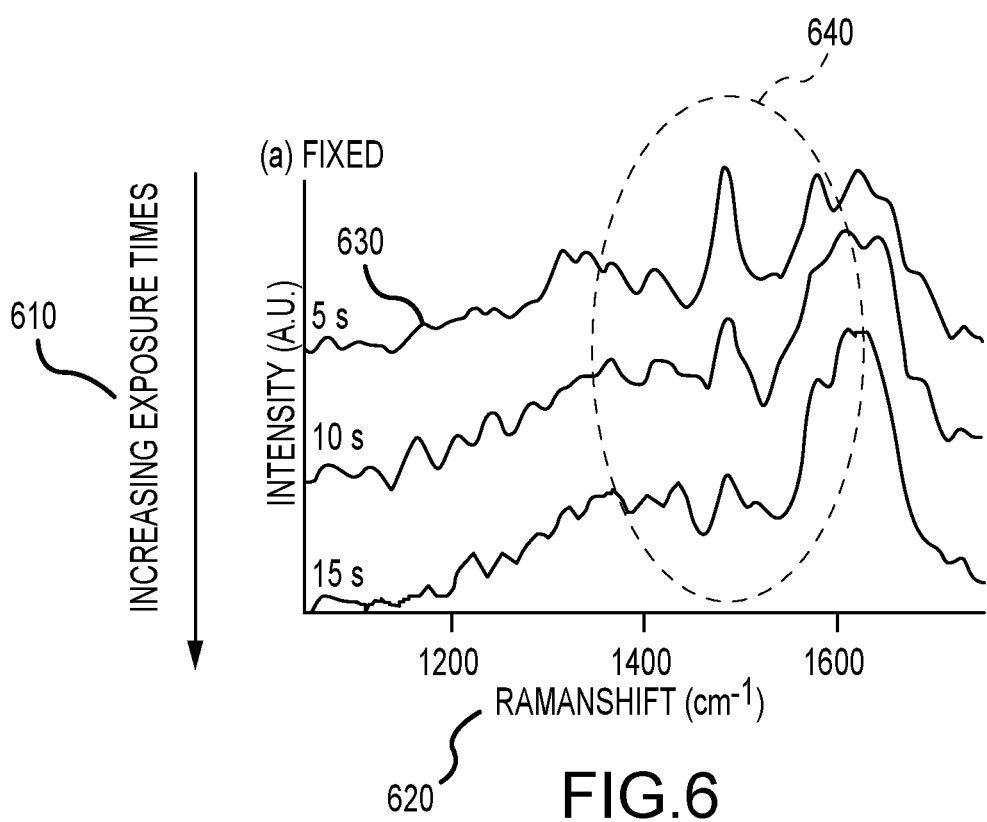
FIG. 6 is an illustration of observed shifted Stokes Raman scattering due to laser pathogen detection and neutralization, according to one embodiment of the present invention.

The modification of the enveloped virus alters its structure. In doing so the detected photon pattern induced by inelastic Stokes Raman scattering changes. This change in the photon pattern is used by the present invention to validate neutralization of a virus present in an area of interest. FIG. 6 shows an example of Raman scattering pattern alteration of a biologic material. The axes of the graph represent intensity of exposure 610 of a pulsed light source versus observed Raman shift scattering 620. The upper line 630 is the photon pattern based on inelastic Stokes Raman scattering after 5 seconds of exposure. As exposure increases the structure of the molecules in the material change resulting in changes 640 in the pattern. Specifically, detected photon scattering at 1400-1500 $cm^{-1}$ significantly change as exposure to deep UV-C increases from 5 to 10 to 15 seconds.

According to one embodiment of the present invention, observed changes to the photon scattering patterns induced by inelastic Stokes Raman scattering between active and inactive virions of interest are recorded and stored in a library accessible by the control and analysis module. By doing so, once a specified virus has been detected and the light output has been tuned to induce capsid protein vibration, changes in the photon scattering pattern can be observed conclusively validating that the virus has been neutralized.

Figure 7:
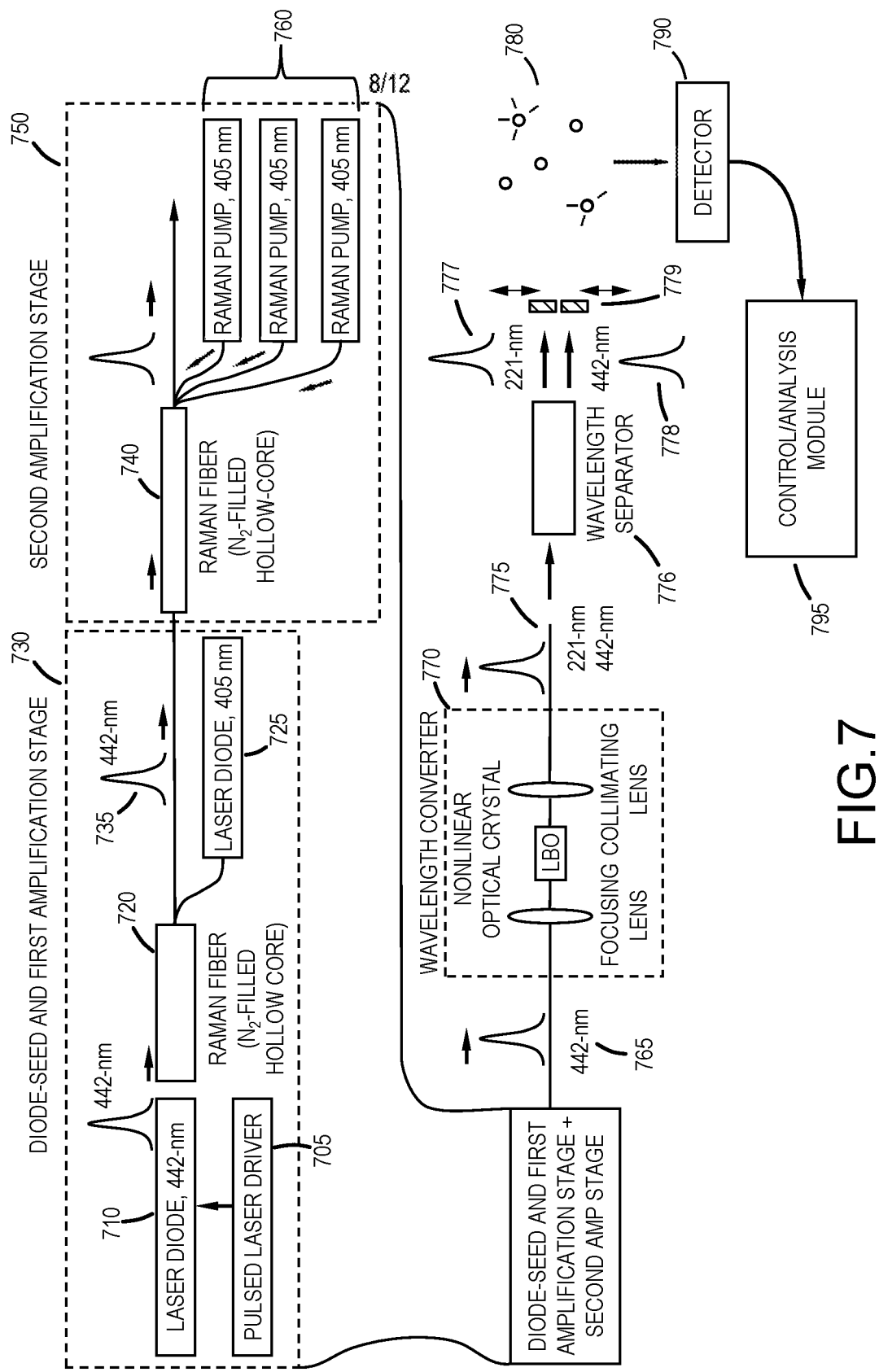
FIG. 7 is a high-level process flow diagram for laser pathogen detection and neutralization according to one embodiment of the present invention.
Figure 8A:
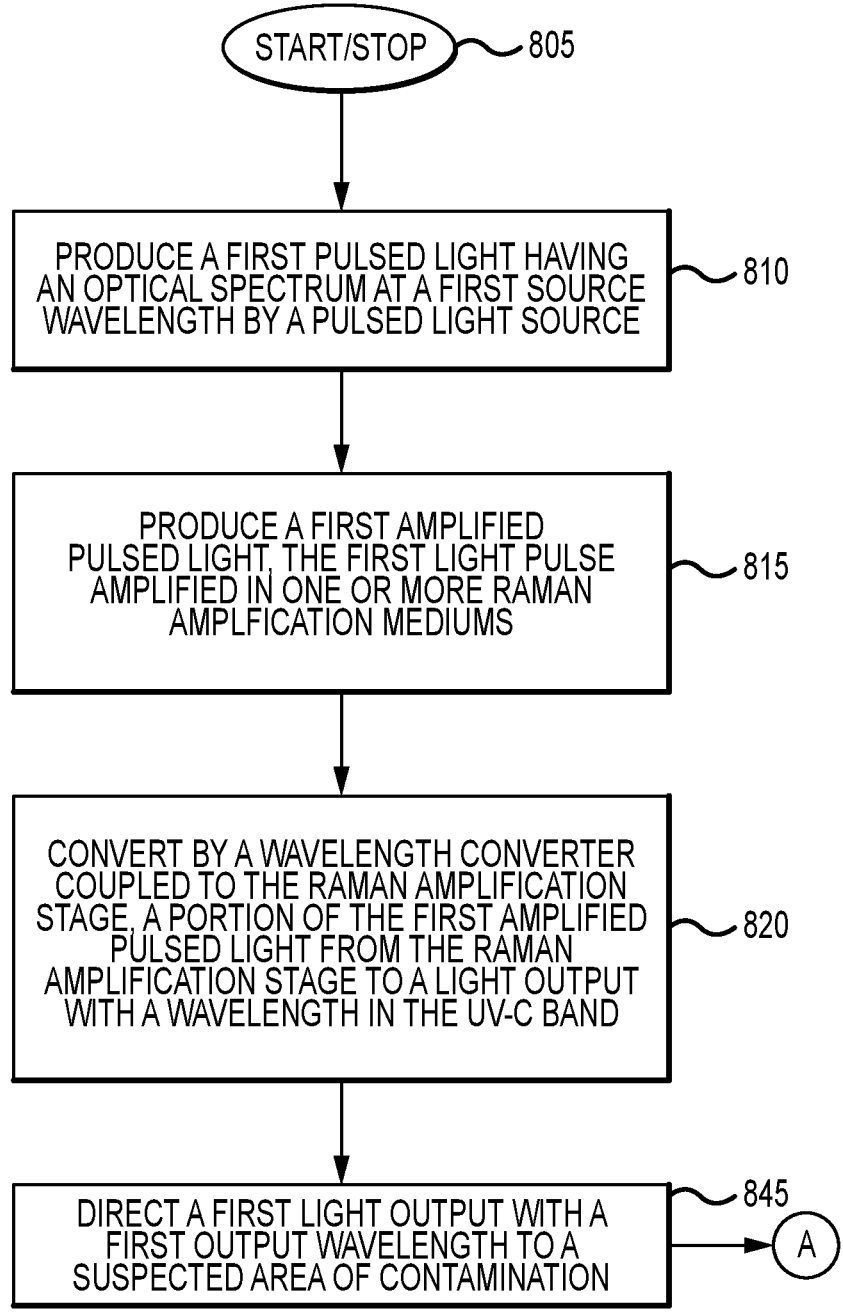
Figure 8B:
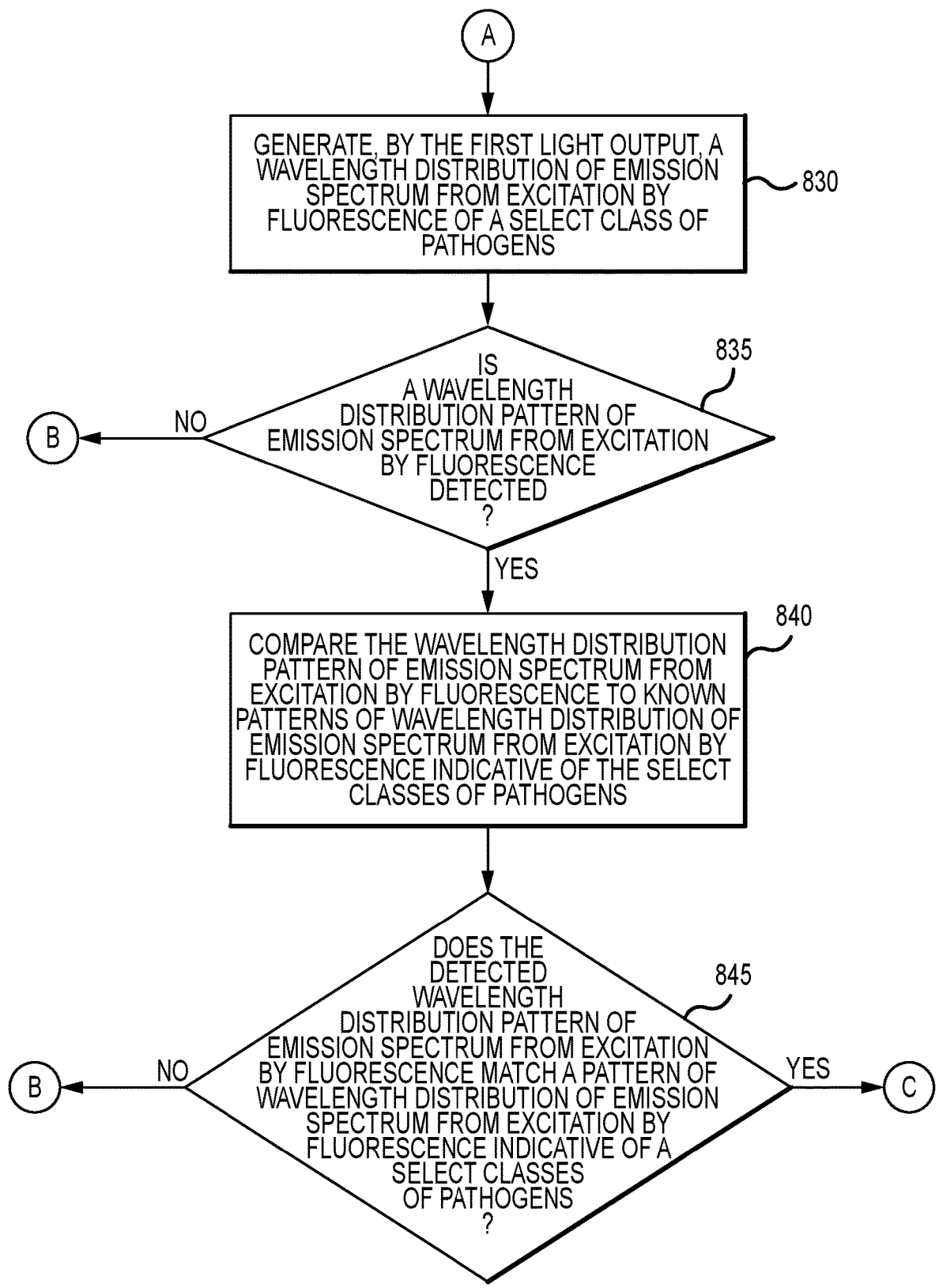
Figure 8D:
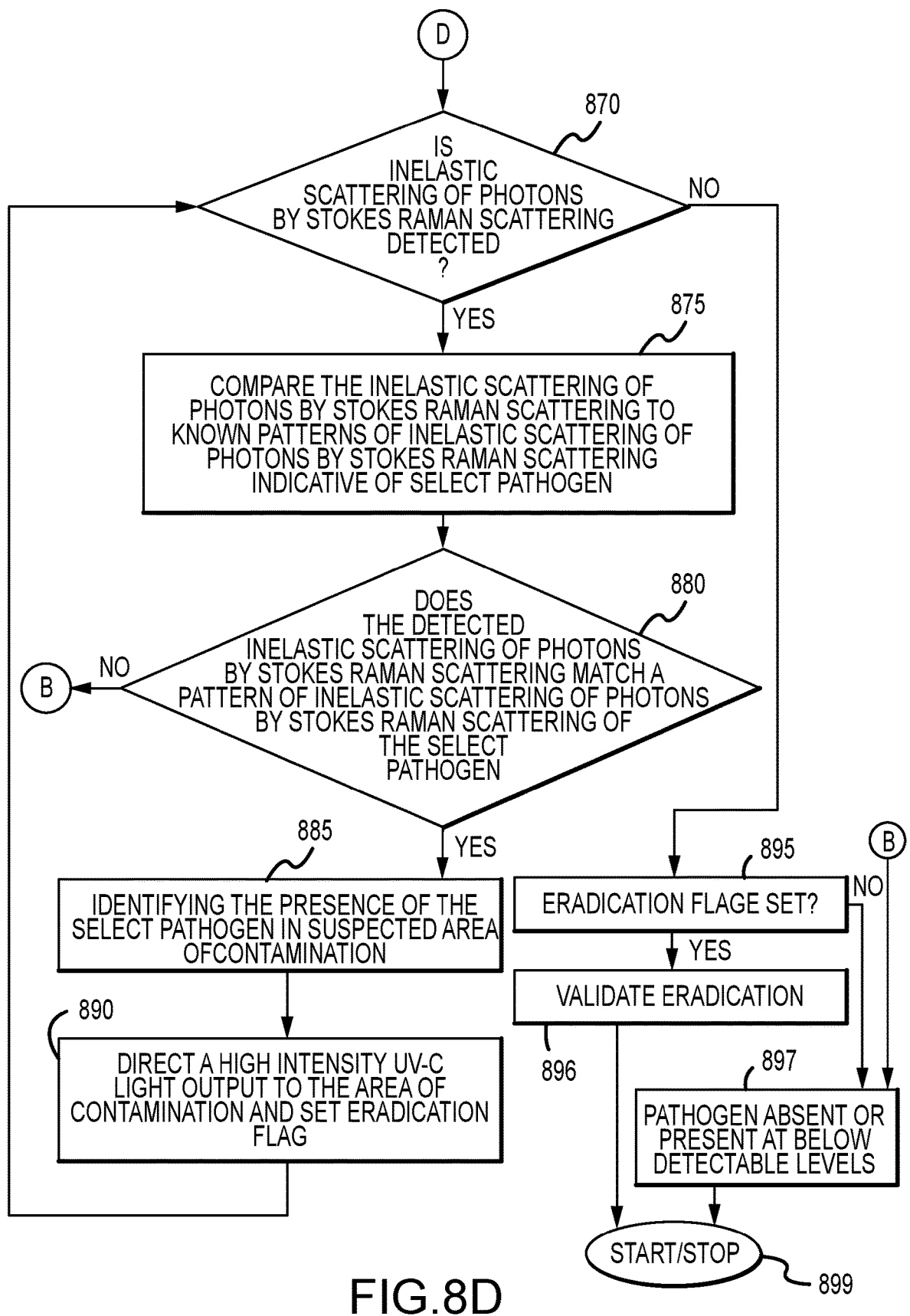

One embodiment of a system for the generation of bright high peak power UV-C pulses while retaining seed signal characteristics is shown in FIG. 7. In the example shown in FIG. 7, a pulsed laser driver 705 introduces a 442 nm seed 710 to a select Raman amplification medium 720 in a first amplification stage 730. In this example a hollow-core $N_2$-filled fiber 720 is used as the Raman amplification chamber. A select Raman pump 725 is introduced raising the peak power of the pulses 735 before being introduced to a second stage Raman amplifier 750.

The seed is further amplified in a second stage 750 by means of Raman amplification in a hollow core optical fiber filled with $N_2$ gas 740 using a plurality of high-power continuous wave (CW) laser diodes 760 as optical pumps. The output of the second stage amplifier 750 is a further amplified optical pulse at 442 nm 765.

Exposure to high brightness UV light pulses can be harmful to human physiology. To alleviate that risk the present invention converts the 442 nm light pulses to 221 nm light pulses by doubling the frequency using a nonlinear optical crystal 770. The amplified pulse from the second stage 765 is introduced into a wavelength converter 770 where a portion of the light converted so that its wavelength is halved (frequency is doubled). The conversion of light from the longer to shorter wavelength takes place, in this example, inside of a lithium triborate crystal that has been cut to be used for this purpose. The output 775 of the wavelength convertor is an optical pulse with a wavelength of 221 nm, a value that falls in the UV-C (ultraviolet-C) optical band from 100 nm to 280 nm, and a coincidental optical pulse with the original wavelength of 442 nm. A wavelength separator 776 is used to produce spatially separate pulses with wavelengths of 221 nm 777 and 442 nm 778. A pair of mechanical shutters 779 then controls which of the two types of optical pulses propagate to a target area 780.

221 nm light is not harmful to the human body. 220-230 nm wavelength light is highly absorbed by dead stratum corneum in the outer layer of the skin. By comparison less than 50% of 254 nm wavelength light commonly found in current UV lamps is absorbed by the stratum corneum leading to a high risk of skin cancer. 221 nm pulsed UV-C light is safter to humans than exposure to sun light.

Initially, the bright UV-C pulses (221 nm wavelength light) are directed over a large region 780 believed to be contaminated or contain on or more viruses. A fluorescence spectroscopy detector 790 monitors the region 780 and reports to the control/analysis module 795 information to be compared to known patterns of fluorescence emission.

Armed with information from the detector and fluorescence emission data from the library, the control module 795 uses the shutters 779 block the output of the UV-C light 777 and enable the 442 nm light 778 to propagate to the target. A less intense (less hazardous) beam of 442 nm light can be used because the location of a potential pathogen has been determined from fluorescence, and the 442 nm light can be focused onto the potential pathogen. A Raman spectroscopy detector 790 monitors the signal from the suspected pathogen and reports to the control analysis module 795 information to be compared to known patterns of Raman scattering. Raman spectroscopic information is used to definitively identify the fluorescing target.

While the embodiment of the present invention illustrated in FIG. 7 and described herein includes two Raman amplification stages, the present invention contemplates one or more stages of Raman amplification. In other embodiments a single amplification stage may be implemented while in another embodiment three or more stages of Raman amplification may be used to gain the correct peak pulse intensity. Indeed, multiple combinations and configurations are contemplated to provide simultaneous detection and neutralization of a plurality of pathogens.

For example, in another embodiment of the present invention parallel fibers and outputs can be employed to allow for concurrent very high-power scaling with vary broad wavelength coverage. Similarly, the first stage Raman amplifier can convert low brightness continuous wave signals (power) to high brightness and high peak power pulses while retaining the seed signal characteristics. Q-CW and CW forward and backward pumps are compatible with the current design.

FIGS. 8A-D provide a flowchart of one methodology for pathogen detection and neutralization using deep UV-C laser pulses. The process begins 805 by producing 810 a first light seed signal at a first source wavelength. The seed signal can be pulsed or a Continuous Wave (CW) or quasi continuous wave (Q-CW) with low brightness. One of reasonable skill in the relevant art will recognize that the intensity and the wavelength of the first light seed can be varied.

The seed is introduced to a Raman amplifier producing 815 a first amplified pulsed light amplified by one or more Raman amplification mediums. While illustrated herein are embodiments with one or two stage Raman amplification processes, Raman amplification can take place over a plurality of stages utilizing a variety of Raman mediums. Regardless of the number of amplification stages, an amplified pulsed light is generated at a select wavelength.

This selectable amplified pulsed light is thereafter converted 820 by a wavelength converter to a first light output at a first output wavelength. As discussed herein, in a preferred embodiment the first output wavelength is between 220 and 230 nm making it safe for human exposure. Once converted the first output light is directed 825 to a suspected area of contamination.

Assuming one or more virions are present in the contaminated area, the light will produce 830 an emission spectrum from excitation by fluorescence. If an emission spectrum from excitation by fluorescence is not detected 835, the virion is absent or present at below detectable levels.

If an emission spectrum from excitation by fluorescence is detected 835 it is compared 840 to known wavelength emission spectrum patterns from select classes of pathogens. If no match 845 is made, the virion is absent or present at below detectable levels.

When the detected emission spectrum from excitation by fluorescence matches 845 a known emission spectrum pattern of a class of pathogens the system moves to refine its identification and, subsequently, to produce a higher intensity more effective neutralization light pulse. Responsive to detecting a matching emission 850, a second output light from the wavelength converter is directed towards the suspected area of contamination 865 to produce a refined amplified pulsed light.

Responsive to detecting a matching emission 850, a second output light from the wavelength converter is directed towards the suspected area of contamination 865 to produce a refined amplified pulsed light. As the presence of a class of virions has already been established by fluorescence, the present invention now looks for inelastic scattering by Stokes Raman scattering.

A detected pattern of inelastic scatting of photons by Stokes Raman scattering is compared 875 to known patterns of inelastic photon scattering stored in the library and available to the control and analysis module. When the detected 880 pattern of inelastic scattering of photons matches a select known pattern of inelastic scattering of photons, the presence of the select pathogen has been identified 885. The present invention thereafter directs 890 high intensity UV-C light output with the second output wavelength at the area of contamination for a period of time, sets a flag that indicates an attempt at eradication has been made 895, and then reassess 870 whether inelastic scattering of photons by Stokes Raman scatting is detected. While the virus is active, detection of the same pattern will occur indicating the presence of an active virus. Upon eradication of the virus, the detected pattern will cease, validating 896 that the select pathogen has been neutralized, ending the process 899. The processes are also terminated 897 if no fluorescence signal is detected or cannot be cannot be identified as representative of a known pathogen.

While the implementation of the present invention above suggests a seed wavelength at 442 nm, other sources at other wavelengths beyond UV-C are both possible and contemplated. Moreover, a seed source from an Ultra-Short Pulsed Laser (USPL) system can be used to increase the peak power and spectrum of the Deep-UV-C pulse or diode laser can be used for the seed that is pulsed combined with the use of an external optical modulator. In another embodiment, a seed laser, other than a diode laser, that is directly pulsed or used with an external optical modulator can be used to form a pulse having a wavelength in the range from 200-nm to 560-nm.

Another option for implementation of the present invention is configuring the pump light so that it propagates in the same direction (co-propagating) in the Raman amplification cavity (medium) as the seed light. Likewise, the present invention contemplates combinations of co-propagating and counter-propagating pump light as well the use of an additional optical resonator for the Raman pump to increase the pump power in the medium. In one version of the present invention an additional optical resonator for the seed signal increases the transfer of optical power from the pump to the seed. Of course, a variety of solids, liquids, or gases can be used for the Raman amplification medium and other non-linear optical crystals (beyond than lithium triborate) can be employed for wavelength conversion.

It will also be understood by those familiar with the art, that the invention may be embodied in other specific forms without departing from the spirit or essential characteristics thereof. Likewise, the naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

While there have been described above the principles of the present invention in conjunction with a laser pathogen detection and neutralization system and associated methodology, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A laser pathogen detection and neutralization system; comprising:
    a pulsed light source producing a first pulsed light having an optical spectrum at a first source wavelength;
    a Raman amplification stage coupled to the pulse light source and one or more selectable Raman amplification mediums, the Raman amplification stage producing a first amplified pulsed light;
    a wavelength converter coupled to the tunable Raman amplification stage wherein the wavelength converter accepts the first amplified pulsed light thereby producing a first light output pulse with a first output wavelength suitable to generate a wavelength distribution of emission spectrum from excitation by fluorescence of a select class of pathogens and wherein the wavelength converter further accepts the first amplified pulsed light and passes a wavelength unchanged portion of the first amplified pulsed light as a second light output pulse for Raman spectroscopic characterization of a select pathogen;
    a shutter mechanism configured to select either the first light output pulse or the second light output pulse from the wavelength converter to be directed towards a target area; and
    a detector, operatively coupled to the pulsed light source and the Raman amplification stage, operable to detect the wavelength distribution of emission spectrum from excitation by fluorescence of the select class of pathogens in the target area.

2. The laser pathogen detection and neutralization system of claim 1, further comprising wherein the first pulsed light is tunable by the Raman amplification stage thereby creating a selectable first amplified pulsed light and thereby a selectable first light output pulse generating inelastic scattering of photons by Stokes Raman scattering from the select pathogen present in the target area.

3. The laser pathogen detection and neutralization system of claim 2, wherein the selectable first amplified pulsed light is tied to the first light output pulse having an optical spectrum at the first source wavelength.

4. The laser pathogen detection and neutralization system of claim 1, wherein the detector is operable to detect a scattering of photons by Stokes Raman scattering from the second light output pulse with a second output wavelength.

5. The laser pathogen detection and neutralization system of claim 4, wherein the detector is operable to identify a match between the detected scattering of photons by Stokes Raman scattering and a known pattern of scattering of photons by Stokes Raman scattering, and responsive to known pattern of scattering of photons by Stokes Raman scattering being associated with the pathogen, detect a presence of the pathogen.

6. The laser pathogen detection and neutralization system of claim 1, wherein a second selectable amplified pulsed light is tied to a second selected Raman amplification medium.

7. The laser pathogen detection and neutralization system of claim 1, wherein the detector identifies decay in emission spectrum from excitation by fluorescence.

8. The laser pathogen detection and neutralization system of claim 1, wherein the detector matches wavelength distribution of emission spectrum from excitation by fluorescence with known wavelength distribution of emission spectrum characteristics of one or more classes of pathogens.

9. The laser pathogen detection and neutralization system of claim 1, wherein the detector matches inelastic scattering of photons by Stokes Raman with known inelastic scattering of photons by Stokes Raman to identify the pathogen.

10. The laser pathogen detection and neutralization system of claim 1, wherein the detector validates inactivation of the pathogen by absence of inelastic scattering of photons by Stokes Raman scattering from the pathogen.

11. The laser pathogen detection and neutralization system of claim 1, wherein the first light output pulse and the second light output pulse are produced from a common pulse light source.

12. The laser pathogen detection and neutralization system of claim 1, wherein the first light output pulse and the second light output pulse are produced from distinct pulse light sources.

13. The laser pathogen detection and neutralization system of claim 1, wherein the first light output pulse and the second light output pulse are produced simultaneously.

14. The laser pathogen detection and neutralization system of claim 1, wherein a selectable first amplified pulsed light and a selectable second amplified pulsed light are selected by the tunable Raman amplification stage.

15. The laser pathogen detection and neutralization system of claim 1, wherein the detector detects coherent anti-Raman scattering.

16. The laser pathogen detection and neutralization system of claim 1, wherein the first source wavelength is at or within the 440 nm to 450 nm range.

17. The laser pathogen detection and neutralization system of claim 1, wherein a second output wavelength is at or within the 200-230 nm range.

18. The laser pathogen detection and neutralization system of claim 1, wherein an average power of the second output light neutralizes the pathogen.

19. A method for pathogen detection and neutralization; comprising:
    producing a first pulsed light having an optical spectrum at a first source wavelength by a pulsed light source;
    producing, by a tunable Raman amplification stage coupled to the pulse light source and one or more selectable Raman amplification mediums, a first selectable amplified pulsed light, the first selectable amplified pulsed light tied to a first of the one or more selectable Raman amplification mediums;
    converting, by a wavelength converter coupled the tunable Raman amplification stage, the first selectable amplified pulsed light from the tunable Raman amplification stage to a first light output with a first output wavelength and wherein the first light output is directed at a target area;
    detecting, by a detector operatively coupled to the pulsed light source and the tunable Raman amplification stage, wavelength distribution of emission spectrum from excitation by fluorescence indicative of the select class of pathogens in the target area;
    responsive to detecting the wavelength distribution of emission spectrum from excitation by fluorescence of the select class of pathogens in the target area, selecting a second of the one or more selectable Raman amplification mediums; and
    producing a second selectable amplified pulsed light from a second of the one or more selectable Raman amplification mediums, wherein the wavelength converter accepts the second selectable amplified pulsed light thereby yielding a second light output with a second output wavelength suitable to generate inelastic scattering of photons by Stokes Raman scattering from the pathogen thereby determining a presence of the pathogen in target area.

20. The method for pathogen detection and neutralization according to claim 19, further comprising generating, by the first selectable amplified pulsed light, a wavelength distribution of emission spectrum from excitation by fluorescence of a select class of pathogens.

21. The method for pathogen detection and neutralization according to claim 19, further comprising producing a second pulsed light by the pulsed light source, wherein the tunable Raman amplification stage thereby creates a refined second selectable amplified pulsed light and the wavelength converter passes a refined second light output with a refined second output wavelength generating refined inelastic scattering of photons by Stokes Raman scattering.

22. The method for pathogen detection and neutralization according to claim 19, further comprising, matching wavelength distribution of emission spectrum from excitation by fluorescence with known wavelength distribution of emission spectrum characteristics of one or more classes of pathogens.

23. The method for pathogen detection and neutralization according to claim 19, further comprising matching inelastic scattering of photons by Stokes Raman scattering from the refined second output wavelength from known inelastic scattering of photons by Stokes Raman scattering patterns thereby identifying the pathogen.

24. The method for pathogen detection and neutralization according to claim 19, further comprising identifying neutralization of the pathogen from an absence of a select inelastic scatting of photons by Stokes Raman scattering.

25. The method for pathogen detection and neutralization according to claim 19, wherein producing includes producing the first light output and the second light output from a common pulsed light source.

26. The method for pathogen detection and neutralization according to claim 19, wherein producing includes producing the first light output and the second light output simultaneously.

27. The method for pathogen detection and neutralization according to claim 19, wherein the first source wavelength is at or within the 440 nm to 450 nm range.

28. The method for pathogen detection and neutralization according to claim 19, wherein the light output wavelength is at or within the 200-230 nm range.

29. The method for pathogen detection and neutralization according to claim 19, further comprising detecting coherent anti-Raman scattering.

30. The method for pathogen detection and neutralization according to claim 19, wherein an average power of the second output light neutralizes the pathogen.

* * * * *